(No Model.)
F. K. DUNN.
ADJUSTABLE HANDLE BAR.
No. 575,879. Patented Jan. 26, 1897.
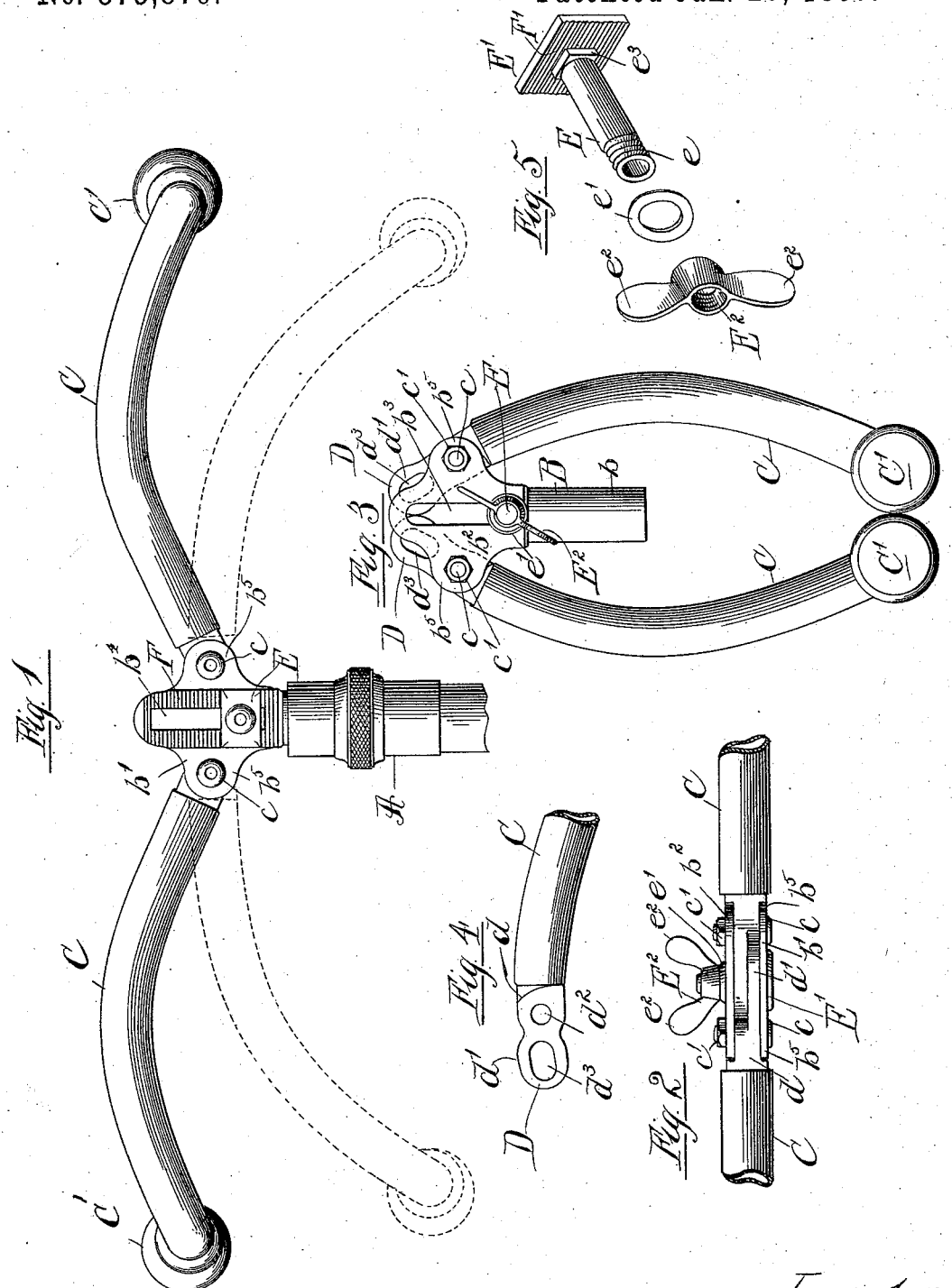
Witnesses
L. Clinton Hamlink
R. Cuthbert Vivian
Inventor
Frank K. Dunn
By Dayton Poole Brown
his Attorneys

UNITED STATES PATENT OFFICE.

FRANK K. DUNN, OF CHICAGO, ILLINOIS.

ADJUSTABLE HANDLE-BAR.

SPECIFICATION forming part of Letters Patent No. 575,879, dated January 26, 1897.

Application filed May 18, 1896. Serial No. 591,976. (No model.)

*To all whom it may concern:*

Be it known that I, FRANK K. DUNN, of Chicago, in the county of Cook and State of Illinois, have invented certain new and useful Improvements in Adjustable Handle-Bars; and I do hereby declare that the following is a full, clear, and exact description thereof, reference being had to the accompanying drawings, and to the letters of reference marked thereon, which form a part of this specification.

This invention relates to improvements in adjustable handle-bars for bicycles and other vehicles provided with vertically-arranged steering heads or posts, to which such handles are attached.

The object of the invention is to provide a handle which may be readily moved from one position to another to accommodate the various uses to which it is desirable to be put, and which may be securely held in any desired position, and at the same time to obtain a durable and inexpensive construction.

The advantages of the invention, as well as the nature thereof, will be more readily comprehended from an inspection of the accompanying drawings and the following description, and will be more fully pointed out in the claims appended thereto.

In said drawings, Figure 1 represents in front elevation the top of a steering head or post of an ordinary bicycle to which my improved adjustable handle-bars are attached, the dotted lines illustrating one of the many positions into which the bars may be moved. Fig. 2 represents the central portion of the handle-bars, showing in plan view the interlocking ends and the locking nut and bolt. Fig. 3 illustrates in a rear elevation the position in which the handle-bars may be placed when it is desirable to place them in convenient shape for shipping or handling. Fig. 4 represents in a side view the interlocking end of one of the side bars. Fig. 5 represents in detached perspective views the locking-bolt, washer, and nut.

In said drawings, A represents the head of the steering-fork post of a bicycle or other part to which the adjustable handle-bars are to be secured. Usually this head will be socketed to receive the depending part of the frame B of the handle-bar, which in this instance is shown in the form of a cylindric stud $b$, and which stud may be secured in any suitable manner, by brazing or otherwise, in the head A.

B designates the frame as a whole, the same consisting of a front plate $b'$ and a rear plate $b^2$, extending in a parallel direction in prolongation of the stud, and being preferably joined together at their lower ends to said stud $b$. As a preferred though not essential construction said plates will be integral with the stud. The rear plate $b^2$ is provided with a vertically-arranged elongated slot $b^3$, and the plate $b'$ is similarly provided with a slot $b^4$. The plates $b'$ and $b^2$ are substantially parallel, and each is extended at opposite sides of the slot $b^3$, preferably in the form of extensions or ears $b^5$ $b^5$, and in the said extended parts are formed bolt holes or openings through which the bolts $c$ are passed, said bolts being properly secured in position by means of the nuts $c'$.

C C are the handle-bars, and C' C' the grips thereof. These handle-bars are of the usual construction, preferably tubular, and each is provided at its inner end with an extension D. One portion of this extension, that lettered $d$, is thicker than the extreme end portion $d'$ thereof, the combined thicknesses of the extreme outer ends $d'$ $d'$ of the extensions D D being together equal to the thickness at $d$, as will be readily understood by reference to Fig. 2 of the drawings. Each extension D is provided with two apertures, one, $d^2$, being for the bolt $c$ to pass through, and upon which bolt the arm C is moved as on a pivot. The other opening, $d^3$, is oblong and extends only through the thinner portion $d'$ of the extension D.

E is a bolt, provided with a head E' and at its outer end with screw-threads $e$, which bolt is adapted to be passed through the slot $b^4$ of the front plate $b'$, through the slots $d^3$ $d^3$ of the extension ends $d'$ of the extensions D D, and through the opening $b^3$ of the rear plate $b^2$.

$e'$ is a suitable washer adapted to be slipped over the screw-threaded end of the bolt E, and E² is a nut provided with lateral lugs or extensions $e^2$, by which the nut may be more readily turned, by means of the finger and thumb, upon the screw-threads of the bolt E, and thus secure the nut in position.

One of the faces, as herein shown the outer or front face, of the front frame-plate $b'$ is roughened or notched to provide a series of serrations, as shown clearly in Fig. 1, and upon the inner surface of the head $E'$ of the bolt E I provide similar serrations, the object being to afford a more perfect frictional contact between the bolt-head and the frame, and thus prevent slipping or displacement of the parts. As a means of readily guiding the bolt vertically through the slots $b^3$ $b^4$ I provide a shoulder $e^3$ upon the inside of the bolt E adjacent to the roughened surface of the head $E'$, which shoulders are of such distance apart as to nicely fit between the sides of the groove or slot $b^4$.

To reduce the weight of the device, I prefer to construct the frame B in the same manner and in the form substantially as illustrated, and I prefer to make the bolts E and $c$ hollow, as shown.

In order to adjust the arms C from the position shown in solid lines in Fig. 1 to that shown in dotted lines, it will simply be necessary to turn the thumb-nut $E^2$ and loosen the bolt E, whereupon the handle-bars may be moved into any desired position, each handle being turned around the bolt $c$ as a pivot and the interlocking parts $d'$ $d'$ of the extensions D D being moved simultaneously. One of the sides of the slot $d^3$ will thus engage the bolt E and cause it to move vertically in the slots $b^3$ $b^4$ into the desired position, whereupon the thumb-nut $E^2$ may be tightened upon the bolt E and the handle-bars C thus securely locked into the desired position. The serrated portion F of the plate $b'$ and the serrated portion $F'$ of the bolt-head $E'$ may be and preferably will be "case-hardened" in order that the device may operate more perfectly and be more durable.

When it is desired to prepare a wheel for shipment, it is necessary either to move the handle-bars down so that the grips $C'$ are relatively close together or else to remove the handle-bars completely from the steering-head A. I avoid doing this latter by simply removing the thumb-nut $E^2$ and the washer $e'$ from the bolt E, withdrawing the bolt completely and then moving the bars C into the position shown in Fig. 3, and then replacing the bolt by inserting it through the slots $b^3$ $b^4$ and clamping it into position by the washer and thumb-nut.

After an experimental use of the device I have found the invention to be entirely practicable, absolutely perfect in its movement and operation, and especially desirable in its adjustable features, because of the ease with which the operator may himself manipulate the adjustment without dismounting from his wheel or without slacking his speed. It will be noticed that with this construction the operator has complete control over the locking of the handle-bars in a desired position by means of a very slight movement of the finger and thumb and the relatively large bearing-surface of the bolt-head $E'$ upon the frame B, together with the case-hardened serrations F and $F'$.

I claim as my invention—

1. The combination of two handle-bars each provided with a pivot-aperture and with an elongated slot located between the pivot-aperture and the inner end of the bar, with a handle-bar frame comprising two rigidly-connected plates, bolts for pivotally mounting the handle-bars between said plates, and means engaging said slots for uniting the inner ends of the said bars together, and at the same time securing them in any desired position to said plates.

2. The combination of two handle-bars having overlapping, inner end portions and each provided with a pivot-aperture and with an elongated slot located between the pivot-aperture and the inner end of the bar, with a handle-bar frame comprising two rigidly-connected plates, bolts for pivotally securing the handle-bars to the frame with the interfitting ends located between said plates, and means engaging said slots for adjustably uniting said inner end portions together, and at the same time securing them in any desired position to said plates.

3. The combination of two handle-bars having overlapping inner end portions and each provided with a pivot-aperture and with an elongated slot located between the pivot-aperture and the inner end of the bar, with a handle-bar frame adapted to be secured to a bicycle-steering post or the like, comprising two upwardly-extending rigidly-connected plates, bolts for pivotally securing the handle-bars to the frame with the overlapping ends located between said plates, and means engaging said slots for adjustably uniting said ends together, and at the same time securing them in any desired position to said plates.

4. The combination with two handle-bars having a pivotal aperture in their adjacent ends, and provided with elongated slots located between the pivot-aperture and the inner end of the bar, the inner apertured end portions of the bars being of reduced thickness so as to overlap each other, of a frame secured at its lower end to a bicycle-steering post or the like, comprising front and rear plates, rigidly connected at their lower ends, arranged parallel with each other and provided with opposite, vertical, elongated, centrally-arranged openings, pivot-bolts extending through said plates at opposite sides of said central openings, and a clamping-bolt passing through the central opening in the plates and through the elongated slots in the handle-bar ends, whereby said ends may be secured together and to the said frame-plates in any desired position.

5. The combination with two handle-bars having pivotal apertures in their adjacent ends, and provided with elongated slots located between the pivot-apertures and their inner ends, said apertured ends of the bars being of reduced thickness so as to overlap, of a frame secured at its lower end to a bicycle-steering post or the like, said frame comprising front and rear plates, rigidly attached at their lower parts and arranged parallel with each each other, and provided with opposite, vertical, elongated, centrally-arranged openings, pivot-bolts extending through said plates at opposite sides of said openings and through said bars, and a clamping-bolt passing through the central opening in the plate and through the elongated slots in the said inner ends of the handle-bars, whereby said ends may be secured together and to the said frame-plate in any desired position, the outer face of one of the said plates adjacent to the central slot, and the inner face of the bolt-head in contact therewith being corrugated, substantially as described.

In testimony that I claim the foregoing as my invention I affix my signature, in presence of two witnesses, this 13th day of May, A. D. 1896.

FRANK K. DUNN.

Witnesses:
TAYLOR E. BROWN,
C. CLARENCE POOLE.